INVENTOR.
Robert J. Dexter

June 2, 1964

R. J. DEXTER 3,135,175

ARTICLE COLLATING APPARATUS

Filed April 26, 1962

INVENTOR.
Robert J. Dexter
BY Biolos & Schlimmer
Attorneys

June 2, 1964  R. J. DEXTER  3,135,175
ARTICLE COLLATING APPARATUS
Filed April 26, 1962  7 Sheets-Sheet 5
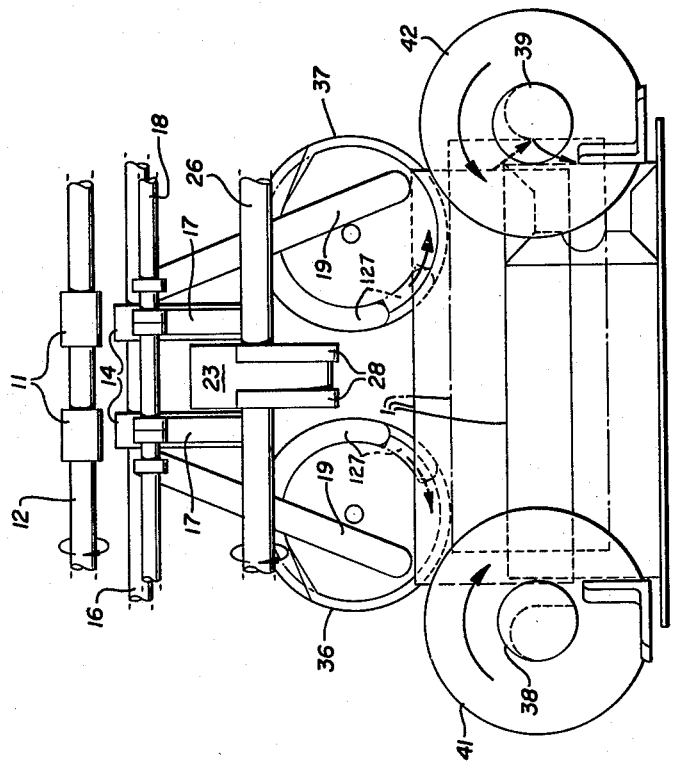
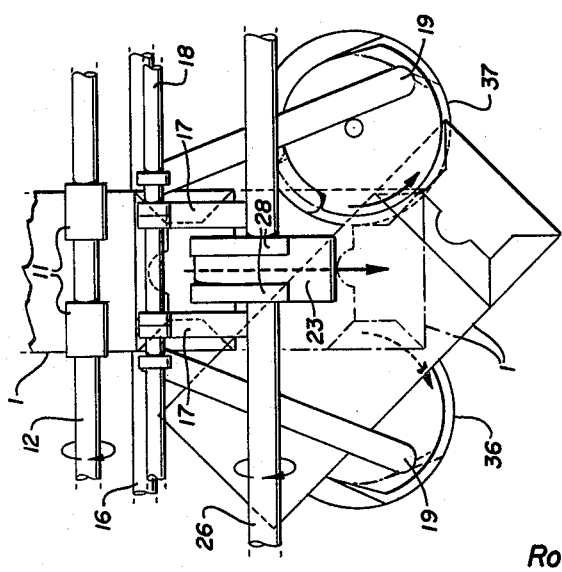
INVENTOR.
Robert J. Dexter
BY
Attorneys

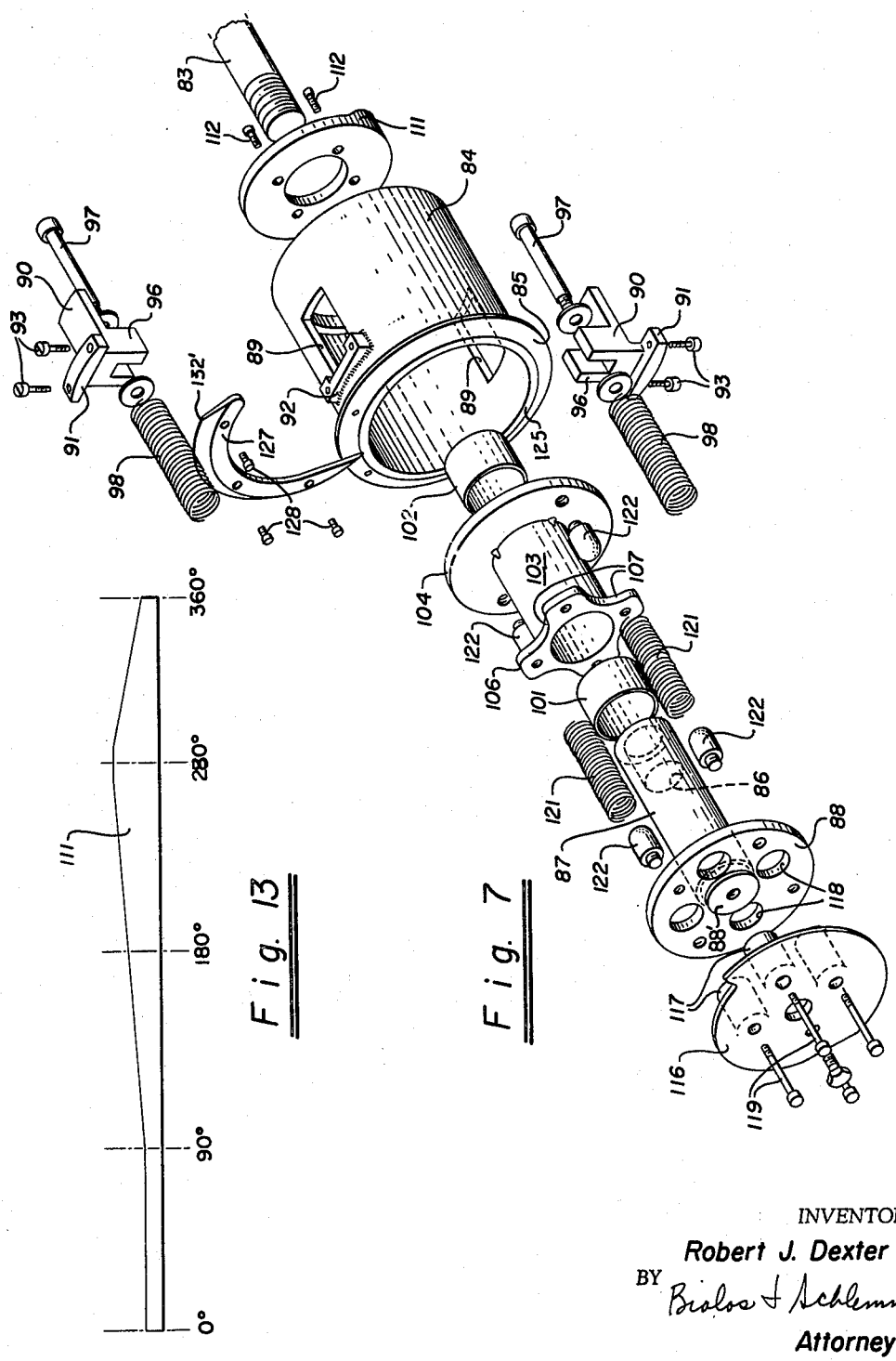

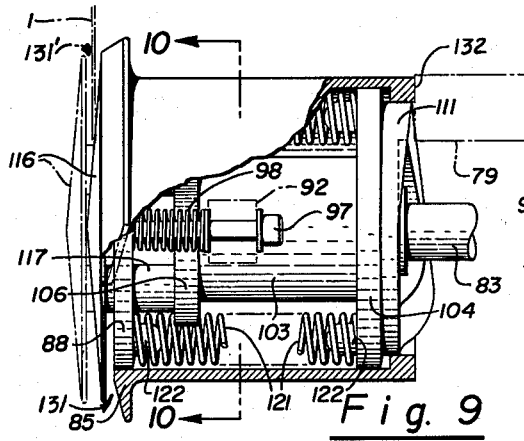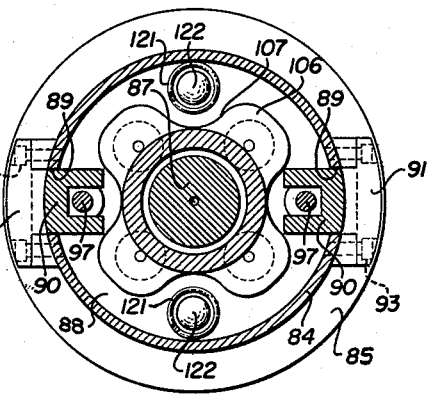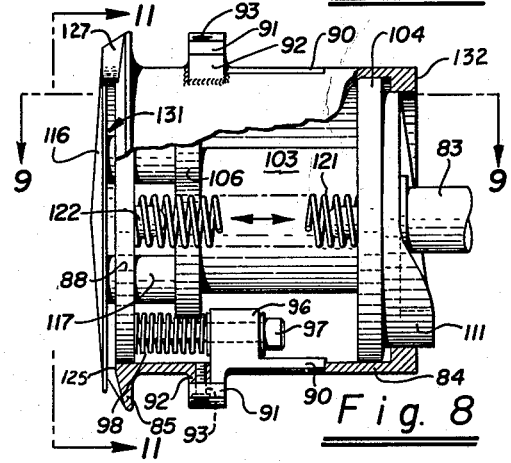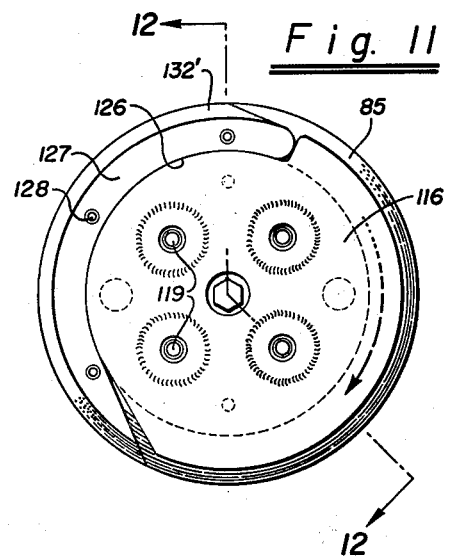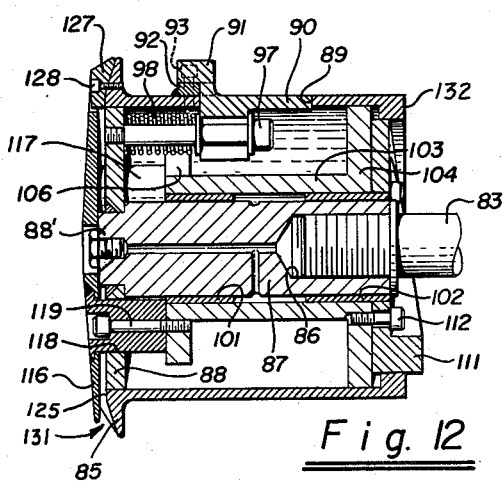

United States Patent Office 3,135,175
Patented June 2, 1964

1

3,135,175
ARTICLE COLLATING APPARATUS
Robert J. Dexter, Antioch, Calif., assignor to Crown Zellerbach Corporation, San Francisco, Calif., a corporation of Nevada
Filed Apr. 26, 1962, Ser. No. 190,430
19 Claims. (Cl. 93—93)

This invention relates generally to apparatus for orienting and collating articles into groups. More particularly, this invention relates to a device for receiving generally flat elongated articles which have dissimilar ends, such as paper bags, from a source of supply and reorienting such articles in groups composed of predetermined number of articles.

Still more particularly, this invention relates to a collating device for paper bags which is to be used in combination with a bag forming machine from which just formed bags are fed to the collating device for grouping for subsequent handling and bundling.

While hereinafter this invention will be directed primarily to a paper bag collating apparatus, it should be understood that the invention is equally well adapted for grouping other articles as well. The purpose of the subject apparatus is to selectively group articles which have dissimilar ends which would cause the articles being collated to be stacked unevenly unless the same are selectively reoriented in a predetermined manner to insure even stacking.

As is well known, paper bags, such as grocery bags, are automatically formed in well known bag forming machines with the bag bottom end folded against one bag side wall. This results in the bottom end of each elongated folded bag discharged from the machine having a greater thickness than the opposite top bag end. As a result, when folded bags are grouped with their bottom ends aligned, such group has a greater thickness at the end thereof which is defined by the folded bag bottom ends.

Accordingly, this invention relates to a device to be used in combination with a bag forming machine for receiving individual flat bags from the machine and for reorienting the same with the folded bottom ends of a given series of bags arranged to face in one direction and for thereafter subsequently reorienting the bottom ends of a subsequent series of bags to face in the opposite direction. By thus stacking predetermined numbers or groups of bags with the bag bottoms in one group facing in one direction and with the bag bottoms in adjacent groups facing in the opposite direction, a generally uniform thickness bag stack may be produced.

Also, an important feature of this invention resides in the fact that the device includes means for automatically controlling the number of bags oriented in a given direction so that discrete groups or series are automatically formed, which greatly facilitates subsequent bundling or handling. That is, an operator stationed at the device, by looking at the bags collated in predetermined groups by the device, can readily pick out a given number of bags merely by counting the number of groups of bags, each of which has a predetermined number of bags in the respective groups.

Generally bags are fed downwardly from the bag forming machine with the folded bottom end of the bag leading. The collating device of this invention selectively grasps individual bags thus discharged from the machine and rotates the same through 90° in a clockwise or counterclockwise direction as has been determined by a prearranged schedule. The device includes control means for effecting grasping and rotation of a given number of bags first in a counterclockwise direction, so that a first group of bags all having their bag bottom ends similarly arranged to extend in the same direction is produced. Thereafter, the control means automatically effects operation of the device so that a like number of bags is collated into a subsequent group with the bag bottom ends similarly arranged and extending in an opposite direction from the bottom ends of the first mentioned group. This bag grouping, with each group preferably containing an equal number of bags, is alternated regularly so that discrete groups of bags are provided in sequence.

By adjusting the control means of the device, the number of bags in a given group may be varied within wide limits. For example, the control means may be set so that fifty bags in succession are oriented in a first direction, and so that the subsequent fifty bags are thereafter oriented in the opposite direction. This alternate collation is then continued as required.

However, the apparatus also is capable of producing a stack of bags in which alternate bags are rotated in opposite directions, that is, in which every other bag discharged from the machine is oppositely oriented. Similarly, the bags may be collated in alternate groups each of which contains any desired number of bags.

The individual bags thus oriented according to a prearranged schedule are positioned onto a take-off conveyor, which preferably includes means for compacting the individual bags fed to the conveyor into a continuous compact stack, as will be described.

An important feature of this invention resides in the particular means for grasping and selectively reorienting bags individually as the same are fed from the forming machine. In this connection, gripper assemblies designed to operate alternately under the control effect of the control means of the device are provided. Each gripper assembly is adapted to grasp and rotate a bag coming from the forming machine through 90° and to place the same in engagement with the take-off conveyor means for removal from the device for subsequent handling, such as the placing of bag groups into a conventional press for bundling for shipment.

By providing a collating device of the type herein described in combination with a bag forming machine, it is possible to eliminate the attendant who normally heretofore was required to attend manually the output end of the bag machine constantly. Accordingly, it is contemplated that a single attendant will be able to handle a bag forming operation completely from the time a parent roll of paper is fed into the bag forming machine until groups of collated bags are bundled for shipment.

From the foregoing, it should be understood that this invention includes as its objects the following: the provision of apparatus for collating articles fed from a supply source of such articles; the provision of a device for collating and reorienting articles having dissimilar ends as the articles are fed from a source of supply; the provision in combination with a bag forming machine of a device for collating paper bags in line with a prearranged sequence into oppositely oriented groups each of which includes a given number of bags; the provision in a bag collating device of novel gripper assemblies for effecting grasping and reorienting of individual bags automatically; the provision of novel control means for regulating operation of the gripper assemblies of the device in predetermined sequences; and the provision of novel take-off conveyor means for removing reoriented bags from the gripper assemblies.

These and other objects will become evident from a study of the following description in which reference is directed to the accompanying drawings.

FIGS. 5 and 6 are partial generally schematic front elevational views of the apparatus showing the sequence of bag reorienting effected by the gripper assemblies of the device;

FIG. 7 is an exploded view of one gripper assembly;

FIG. 8 is a partially broken away view of an assembled gripper assembly;

FIG. 9 is a horizontal sectional view through a gripper assembly taken in the plane of line 9—9 of FIG. 8;

FIG. 10 is a vertical sectional view through a gripper assembly taken in the plane of line 10—10 of FIG. 9;

FIG. 11 is a front elevational view of a gripper assembly taken in the plane of line 11—11 of FIG. 8;

FIG. 12 is a vertical longitudinal sectional view through a gripper assembly taken in the plane of line 12—12 of FIG. 11; and FIG. 13 is a developed view of the profile of the camming surface of a cam ring employed in a gripper assembly.

Figure 1:
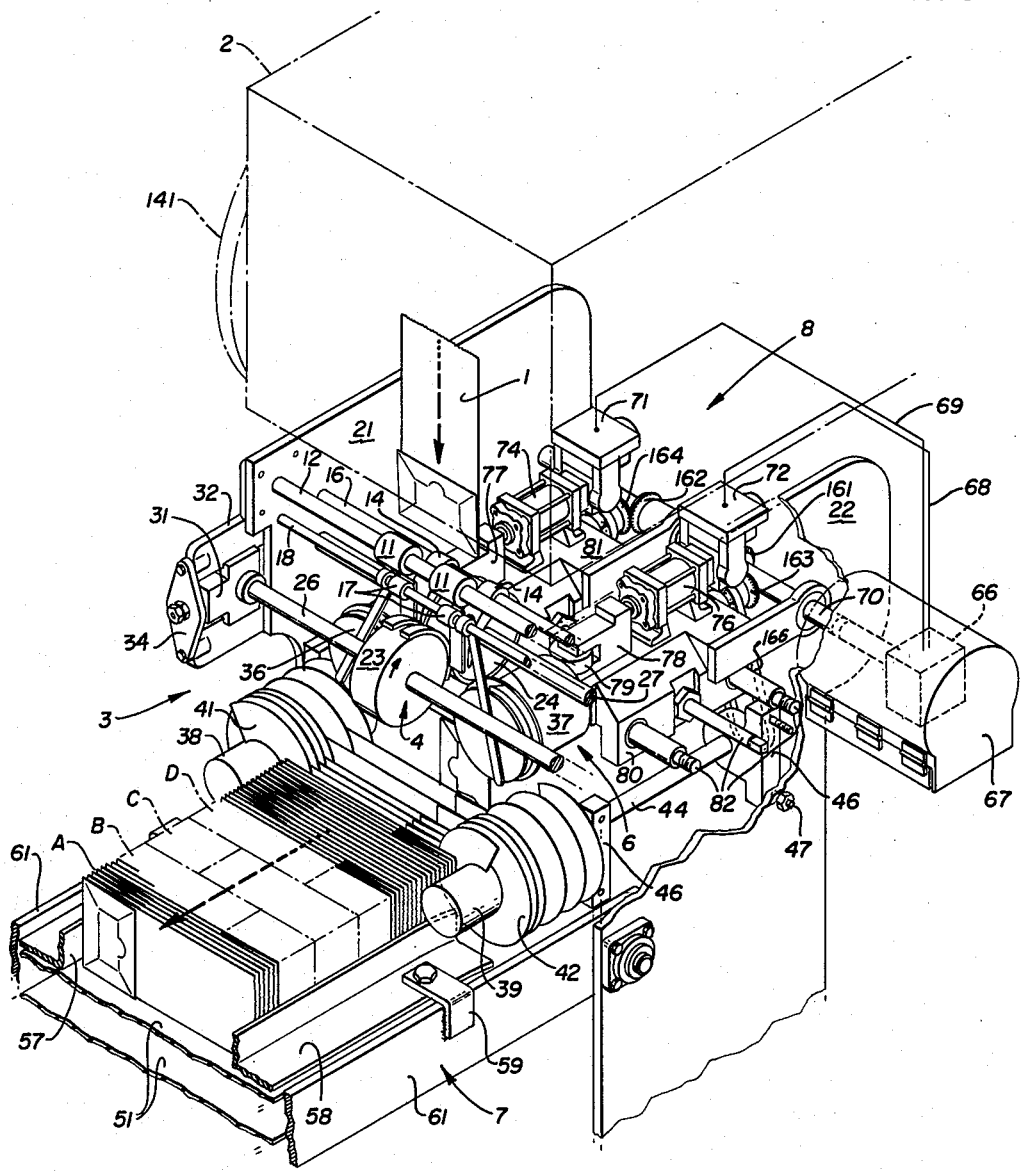
FIG. 1 is a generally isometric view of the subject apparatus shown in combination with a source of supply of articles to be collated, such as a bag forming machine illustrated schematically in phantom lines.

Referring first to FIG. 1, a brief description of the operation of the subject invention will be given. Articles to be collated, which in the embodiment illustrated are paper bags 1, are fed vertically downwardly in the well known manner from a source of supply, such as a paper bag forming machine illustrated schematically and generally designated 2. Bags are fed individually from the forming machine with their bottom folded ends leading. The bags are discharged into the subject collating device, generally designated 3, between feed means 4 of the device which receives the bags in sequence and feeds them in contact with means 6 for grasping and reorienting the bags so that each bag is rotated through about 90° until its bottom end faces either to the right or to the left in FIG. 1 as determined by a prearranged plan. Each bag thus reoriented by grasping and reorienting means 6 is positioned on take-off conveyor means, generally designated 7, for removal from the device for subsequent bundling or other handling.

Operation of means 6 for grasping and selectively rotating individual bags either to the right or to the left as the same are discharged from the bag forming machine is regulated by control means, generally designated 8. As will be described in detail, the control means includes a mechanism for selectively actuating the bag grasping means 6 for rotating the bags in series in accordance with a prearranged plan. That is, the control means is operable so that a given number of bags fed from the machine are first rotated so that their bag bottoms face to the right as viewed in FIG. 1, and so that a subsequent and preferably similar number of subsequent bags are oriented in series automatically with their bag bottoms facing to the left in FIG. 1.

In this way, a continuous supply of bags is collated into groups, each of which is comprised of a predetermined number of bags with the bag bottoms in adjacent groups facing in opposite directions. That is, as seen in FIG. 1, the bags fed from the machine are collated into groups such as A, B, C, D and so on, with the number of bags in each group being equal, so that a continuous even stack of bags is moved along the take-off conveyor means 7 for transferral to a bundling press or the like by a machine attendant. Thus a uniform thickness stack is provided. Also, it is a simple matter for an attendant to determine how many bags have been collated merely by counting the groups and multiplying by the number of bags in each group. This greatly facilitates bag bundling.

The number of bags collated into each group can be regulated by adjusting a suitable counter mechanism incorporated into the control means in the manner to be described.

Referring now to FIGS. 1, 2, 3, 5 and 6, the individual bags manufactured in the bag forming machine are fed from a large drum cylinder (not shown) with the folded bag bottom end of each discharged bag leading as the bag moves vertically downwardly. A pair of small guide rollers 11 mounted on a rotatable shaft 12 help guide the individual bags from the bag machine cylinder into a converging passageway 13 (see FIG. 3) formed by a pair of spaced guide members 14 mounted on a fixed shaft 16 and a pair of opposite guide members 17 mounted on another fixed shaft 18. Also secured to shaft 18 and depending therefrom in generally diverging relationship are a pair of spring guides 19 (see FIGS. 2, 5 and 6) intended to maintain each bag properly arranged during rotation thereof.

Figure 2:
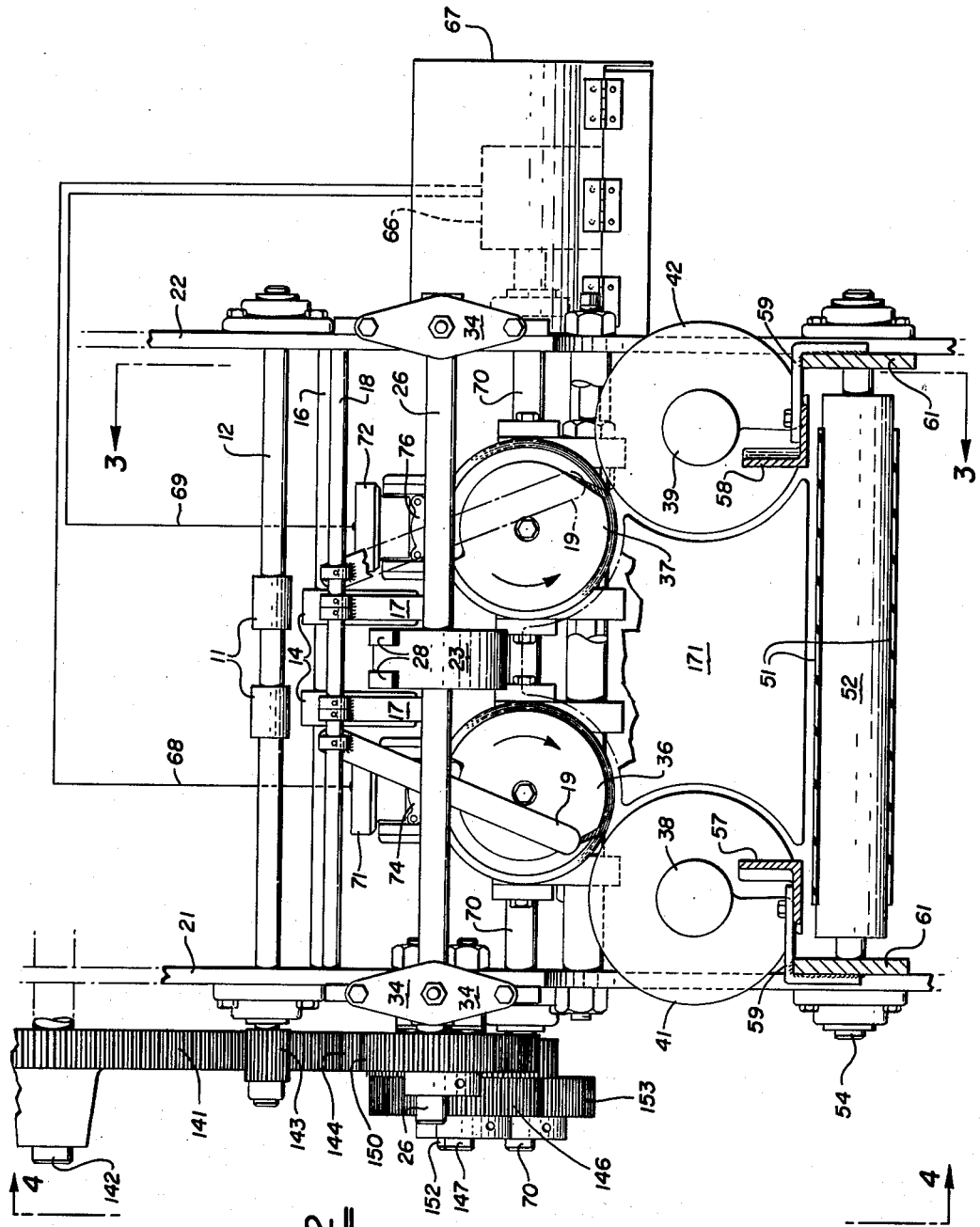
FIG. 2 is a front elevational view of the subject apparatus.

As seen in FIGS. 1 and 2, the aforementioned shafts 12, 16 and 18 extend transversely of the subject device between opposite upright frame members 21 and 22 which define the supporting frame of the device.

Figure 3:
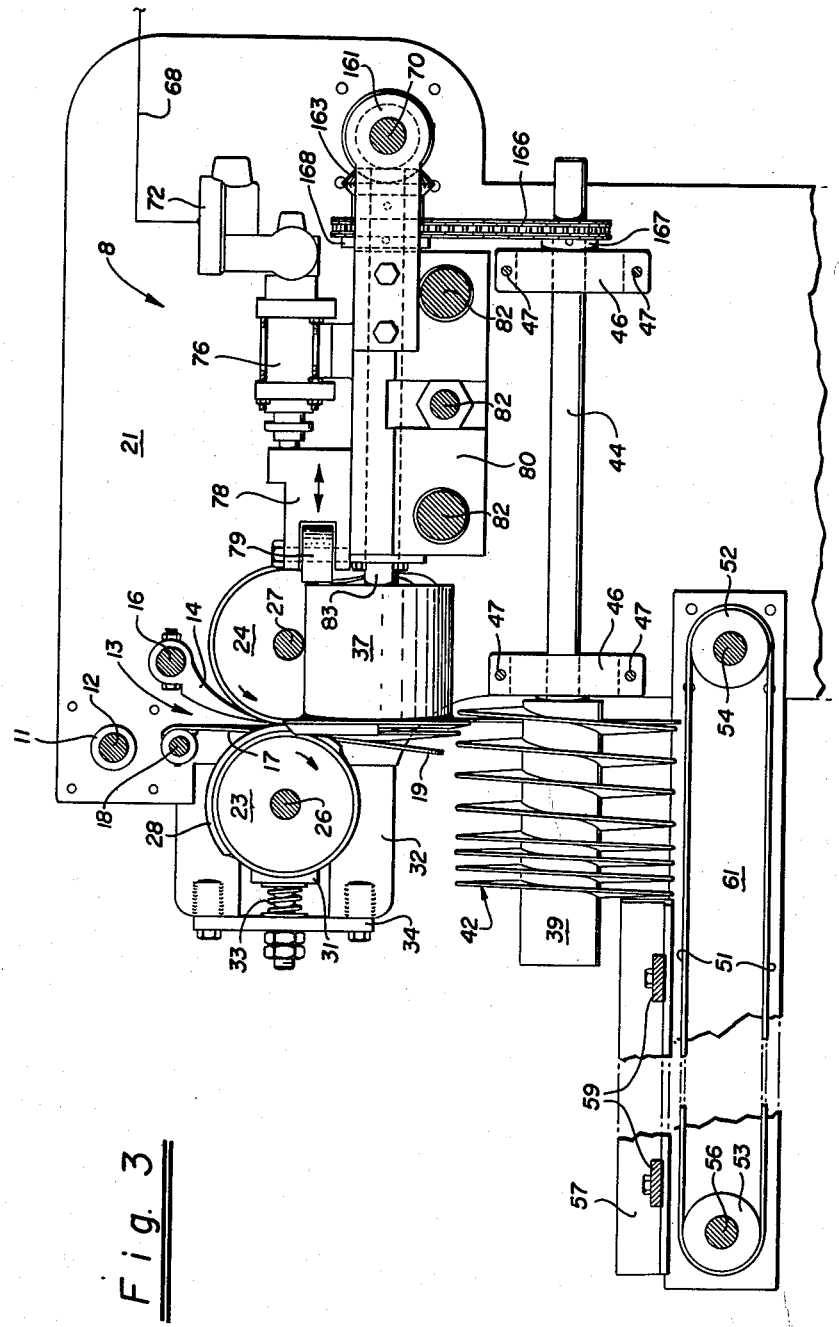
FIG. 3 is a vertical section through the apparatus taken in the plane of line 3—3 of FIG. 2.

The aforementioned feed means 4 for receiving individual bags from the bag source as the same are fed through the converging passageway 13 comprises a pair of fed rolls 23 and 24 mounted for rotation toward each other on rotatable shafts 26 and 27 respectively. Feed roll 23 has a pair of raised arcuate sections 28 which extend substantially half way therearound as seen in FIG. 3. These raised sections engage the periphery of the back-up feed roll 24 when the rolls are in the FIG. 3 position and pull a bag downwardly between the feed rolls as the bag passes into passageway 13 from the bag forming machine. However, when the rolls have rotated about 180° from the FIG. 3 position a gap exists between the rolls so that the rolls will not interfere with rotation of the bag by the grasping means 6 to be described.

Preferably, as seen in FIGS. 1 and 3, shaft 26 with which feed roll 23 rotates is mounted on the side frame members 21 and 22 of the apparatus by means of a pair of slidable mounting plates 31 each of which is slidably positioned in a frame extension 32. Each plate 31 is spring urged toward the apparatus by a spring member 33 which is interposed between the plate 31 and an end plate 34 bolted or otherwise secured to the extension 32. In this manner, feed roll 23 is spring urged into engagement with back-up feed roll 24 so that a tight friction grip is insured on a bag fed between the rolls.

Referring now to FIGS. 2, 5 and 6, the means for grasping and rotating each bag comprises a pair of left and right gripper assemblies 36 and 37 respectively. As will be described in detail hereinafter, as each bag of a predetermined series is fed downwardly by the feed rolls in the manner schematically shown in FIG. 5, the right gripper assembly 37 grasps the bottom folded portion of the bag, as seen in dotted lines, and subsequently rotates the same counterclockwise through approximately 90° at which time the bag is released by the gripper assembly onto the take-off conveyor means 7 as seen in FIG. 6. The left gripper assembly functions similarly when actuated by the control means.

As noted previously, the gripper assemblies are adapted to operate in accordance with a predetermined sequence so that one assembly is operatively actuated through a predetermined number of bag grasping and rotating sequences to rotate and collate a given number of bags, while the other gripper assembly is maintained operatively inactive in a retracted position. As seen in FIG. 5, when a bag is grasped and rotated by the activated right hand gripper assembly, spring guide 19 holds the top end of the bag against the front surface of the inactive left hand gripper assembly 36, so that the bag is properly positioned during rotation. The converse is true when the bag is gripped by the left hand gripper assembly 36 and rotated clockwise as viewed in FIGS. 5 and 6.

Figure 4:
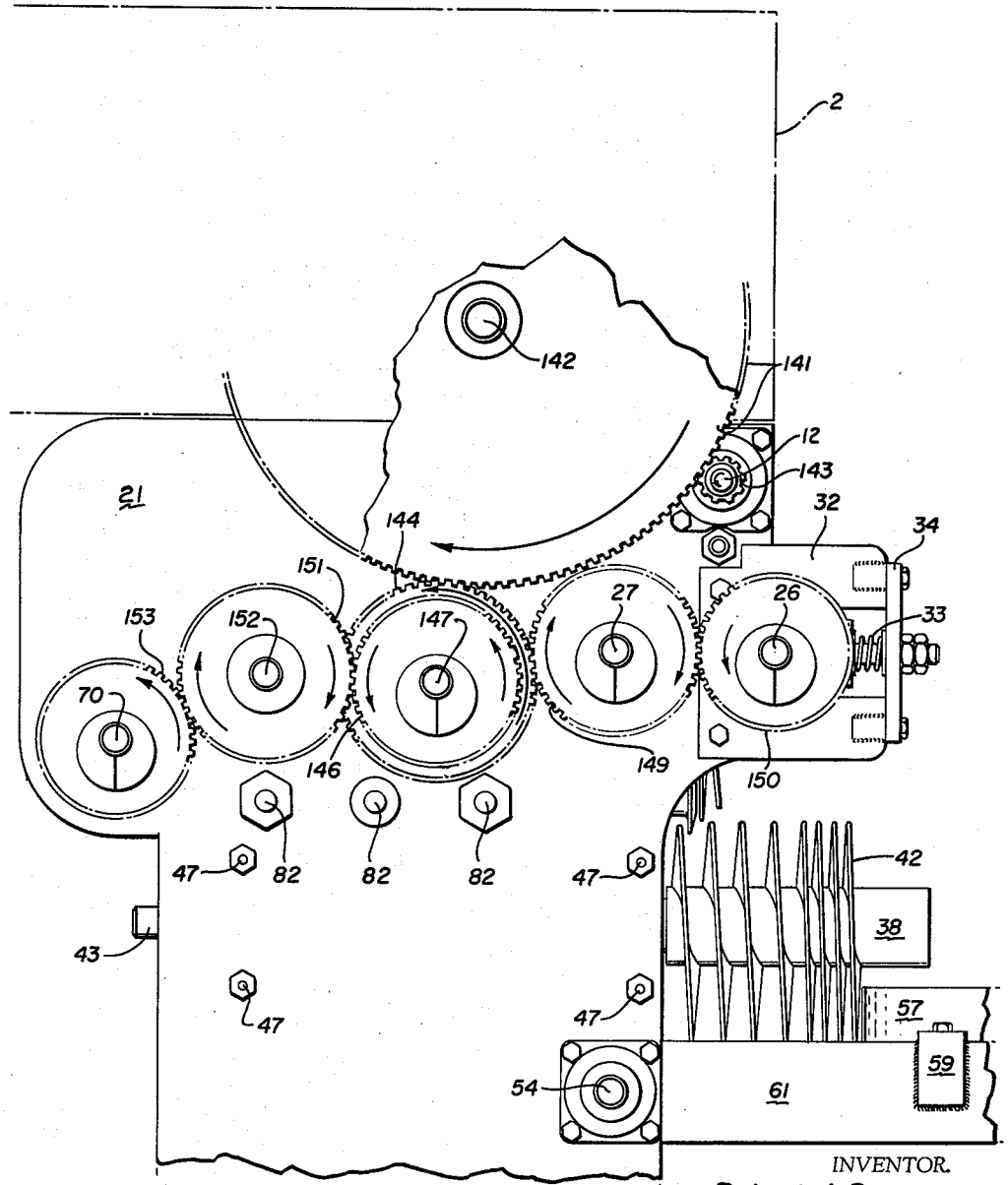
FIG. 4 is a side elevational view of the subject device taken in the plane of line 4—4 of FIG. 2.

Individual bags grasped and reoriented by the respective gripper assemblies, so that their bottom ends extend either to the right or left, are discharged to the take-off conveyor means. In the embodiment illustrated, such take-off conveyor means includes a pair of spaced left and right hand worm members 38 and 39. Each worm member is continuously rotated towards the other in the manner seen in FIG. 6, and each includes a continuous helix, 41 and 42 respectively, the pitch of which progressively decreases away from the gripper assemblies as best seen in FIGS. 3 and 4.

A reoriented bag positioned between the helices of the worm members is thereby progressively moved away from the device and each bag thus moved is ultimately pressed against the preceding collated bag in the manner shown generally in FIG. 1. This insures that a compact stack of bags is provided. The respective worm members 38 and 39 are mounted for rotation on elongated rotatable shafts 43 and 44 rotated by means to be described. Each shaft is mounted for rotation in a pair of bearings 46 bolted or otherwise secured by fasteners 47 to the respective side frame members 21 and 22 of the apparatus as seen in FIG. 3. Although not specifically illustrated in the drawings, it should be understood that the bearings may be adjustably secured to the frame members to allow for transverse adjustment of the shafts relative to each other so that bags and other articles of varying sizes may be accommodated between the worm members. Preferably the worm members are continuously rotated during operation of the apparatus.

The take-off conveyor means of the apparatus also includes, in the embodiment illustrated, a continuous conveyor belt 51 which passes over pulleys 52 and 53 at opposite ends of the belt. The respective pulleys 52 and 53 are mounted on rotatable shafts 54 and 56. The belt may be rotated about its pulleys at a predetermined speed suitably timed with respect to the speed of rotation of the worm members by driving either of shafts 54 and 56 from the common power source for the apparatus to be described. If preferred, a separate power source may be employed to drive belt 51. The belt carries the compacted groups of bags from the device to a location where the bags may be discharged for bundling or other handling. It should be understood that take-off conveyor belt arrangements different from the illustrative arrangement shown may be employed with the worm members if found preferable.

Opposite bag guide rails 57 and 58 are supported above the upper reach of the belt 51 by angle brackets 59 secured to respective extensions 61 projecting from the side frames 21 and 22 of the apparatus. The guide rails maintain proper alignment of the collated bag groups positioned on the belt and compacted by the worm members. The pulley shafts 54 and 56 are journaled for rotation in extensions 61 as seen in FIG. 3.

Operation of the right and left hand gripper assemblies 36 and 37 is controlled by the aforementioned control means 8. Such means includes an adjustable counter mechanism of any suitable type which is generally designated 66 and shown schematically in FIGS. 1 and 2 positioned within a protective enclosure 67 mounted on side frame member 22 of the apparatus. The counter mechanism chosen may be selected from several suitable mechanisms which are presently available and accordingly has not been illustrated in detail. In this regard, by way of example, a counter mechanism of the type manufactured by Spellman Television Co. of New York, New York, and identified as its model 99 Electronic Batch Counter, could be employed. Alternatively, however, a counter mechanism of the type disclosed in my just filed copending application, Serial No. 190,395, filed April 26, 1962, and entitled, "Counting Control Device," preferably is employed because of its capability of withstanding wear at extremely high speeds.

The function of the counter mechanism employed is to keep track of the number of revolutions made by a shaft 70 to which it is operatively connected. Such shaft in turn is operatively connected with the gripper assemblies of the apparatus. Preferably the counter mechanism chosen includes adjustment means in conjunction therewith so that the counter may be pre-set to perform its intended function after the number of revolutions, or portion thereof, made by shaft 70 has reached a predetermined value. This permits regulation of the gripper assemblies so that a given gripper assembly may be actuated through any given number of cycles while the other gripper assembly is maintained inoperative. With the present invention, the counter employed is intended to transmit an electrical signal to solenoid means after the counter shaft 70 has made a predetermined number of revolutions. The solenoid means in turn regulate operation of the gripper assemblies in alternate sequences in response to the signals received from the counter.

The counter mechanism employed preferably is operatively and electrically connected to the gripper assemblies by electrical connections 68 and 69, shown schematically in FIGS. 1 and 2. The counter mechanism chosen preferably includes a microswitch (not shown) which is actuated (after a predetermined number of revolutions, or part thereof, of the shaft 70 have been completed) to transmit electrical impulses from the counter mechanism selectively to one of two solenoids, generally designated 71 and 72 in FIGS. 1 and 2. For example, after shaft 70 has rotated a predetermined amount, in full or partial revolutions as desired, an impulse is transmitted to solenoid 71 which effects operation of the left gripper assembly 36 while the right gripper assembly 37 is maintained operatively inactive. Following operation of the left gripper assembly through a predetermined number of sequences, determined by the adjustable setting of the counter mechanism, so that a given number of bags are oriented with their bottom ends toward the left as seen in FIG. 1, the counter mechanism then transmits a signal to solenoid 72, the circuit to solenoid 71 being simultaneously broken. This results in inactivation of the left gripper assembly 36 and initiation of operation of the right gripper assembly 37 through a predetermined number of sequences, also determined by the adjustable setting of the counter mechanism, so that a predetermined number of bags are thereby oriented with their bottom ends toward the right as seen in FIG. 1. Thereafter, the counter alternately sends signals to the respective solenoids so that the right and left hand gripper assemblies are alternately actuated through a predetermined number of operative cycles to automatically collate predetermined numbers of bags into discrete groups.

Each of solenoids 71 and 72 is in turn operatively connected in well known fashion with one of a pair of conventional air cylinders 74 and 76. The piston of each air cylinder has secured to its outer end a slide member, 77 and 78 respectively, on which cam means in the form of a cylindrical cam follower 79 is mounted for rotation about an upright axis in the bifurcated end of each slide member. Each cam follower is to be engaged with the housing of and other cam means provided in the respective gripper assemblies for operatively actuating the gripper assemblies when the slide members are selectively and alternately extended in conjunction with the electrical impulses transmitted to the solenoids 71 and 72 by the counter mechanism. The solenoids when actuated operate the air cylinders 74 and 76 to extend alternately the slide members 77 and 78 and their cam followers 79 into alternate contact with the respective gripper assemblies.

It should be understood that the air cylinders are alternately actuated by the respective solenoids and that the air cylinder pistons and cam followers are alternately maintained extended to effect operation of the respective gripper assemblies through the predetermined number of cycles of operation determined by the setting of the counter mechanism.

The respective air cylinders and solenoids are mounted on supporting platforms 80 and 81 as seen in FIGS. 1 and 3. Threaded mounting shafts 82 are employed to support the respective platforms between the side frame members 21 and 22 of the apparatus. Preferably the supporting platforms are adjustably mounted on the shafts 82 so that the platforms are movable laterally relative to each other so that bags of various sizes may be accommodated by the gripper assemblies. The slide members 77 and 78 which carry the respective cam followers 79 to be engaged with the gripper assemblies are slidable on the top surfaces of the supporting platforms 80 and 81.

Reference is now directed to FIGS. 7 through 12 which illustrate the construction of the novel gripper assemblies of this invention. In the embodiment illustrated, the left hand gripper assembly 36 is illustrated, but it should be understood that the right hand assembly is substantially identical in construction therewith with a minor exception to be pointed out subsequently.

As seen in FIG. 3, each gripper assembly is mounted for rotation on a rotatable shaft 83. Each shaft 83 in turn is continuously driven from aforementioned shaft 70 in a manner to be described. In the embodiment illustrated, each revolution of shaft 70 effects one revolution of shaft 83. By employing suitable gearing, however, this rotational relationship may be modified as desired for a particular purpose.

Each gripper assembly includes a generally circular cylindrical housing 84 having an enlarged circular bag clamping flange 85 at one end thereof. The end of shaft 83 is threadedly or otherwise secured in an axial bore 86 of a hub member 87 which at its end opposite such bore has a circular guiding face plate 88 secured thereto, such as by welding. The diameter of the face plate 88 corresponds generally to the internal diameter of housing 84. A circular boss 88' projects a predetermined distance beyond the outer surface of face plate 88, as best seen in FIG. 7, for the purpose to be disclosed.

Means are provided for operatively connecting hub 87 with the housing and, in the embodiment illustrated, the housing is provided with diametrically opposed apertures 89 in which stop members 90 are removably positioned. Each stop member is provided with an elongated offset projection 91 which is engageable with respective bosses 92 provided on the housing adjacent apertures 89. The projections on the stop members are apertured, and screw members 93 are employed to maintain the stop members engaged with the housing. Each of the stop members is also provided with a bifurcated inner projection 96 between the legs of each of which an elongated shoulder bolt 97 is engageable.

As seen in FIGS. 8, 9 and 12, the shoulder bolts are threadedly engaged with the face plate 88 secured to hub 87, and the hub is thereby operatively secured and integrally connected with the housing. Spring members 98 surround the respective shoulder bolts and maintain the bolts in operative contact with the bifurcated projections of the respective stop members and thereby urge the housing toward the right in FIGS. 8, 9 and 12. The housing is capable of limited longitudinal movement relative to the hub for the purpose to be discussed.

Rotation of shaft 83 effects rotation of hub 87 and face plate 88 therewith. Through the face plate and its connection to the housing, rotation of the housing is similarly effected. As noted previously, because shaft 83 rotates generally continuously during operation of the apparatus, rotation of the housing also is continuous.

Surrounding hub 87 and spaced slightly therefrom by circular ring bearings 101 and 102 is a spring holder member 103. At one end the spring holder is provided with a circular flange 104 and at its opposite end with a clover-leaf flange 106 which has a series of arcuate cutout portions 107 formed in the periphery thereof, as best seen in FIGS. 7 and 11.

Cam means in the form of a cam ring 111 is secured by screw fasteners 112 to the flange 104 of the spring holder 103. It is such cam ring 111 which is engaged by the cam follower 79 of the associated slide member 77 when the slide member is extended by the air cylinder 74 of the control means.

The configuration of the camming surface employed on the circular cam ring 111 of the embodiment of the apparatus illustrated is best seen in FIG. 13. As shown, the camming surface is generally level for its first 90° and then is provided with a generally straight line cam rise from 90° to approximately 270°, after which it levels off for approximately 20°. Thereafter, the camming surface abruptly drops off until it joins the level section at the 360° location.

A gripper plate 116 is secured to the cloverleaf flange 106 of the spring holder member. The gripper plate includes a plurality of generally cylindrical apertured bosses 117 which project from the generally flat inner bag clamping surface of the gripper plate. When the gripper assembly is assembled, bosses 117 pass through apertures 118 provided in face plate 88 secured to the hub 87. Screw fasteners 119 are in turn positioned through the bosses and are threadedly engaged with clover-leaf flange 106, as seen in FIG. 12. In this manner, the gripper plate is integrally connected with the spring holder member and thereby to the cam ring 111 for movement therewith.

A pair of coil springs 121 are interposed between face plate 88 and the circular flange 104 of the spring holder member 103 and normally urge the spring holder member axially away from the face plate. This, in turn, normally urges the gripper plate attached to the spring holder toward the outer surface of the face plate and into contact with boss 88' projecting from the face plate as seen in FIG. 12. Boss 88' thereby insures that a space or gap is at all times maintained between face plate 88 and gripper plate 116 for the purpose to be disclosed.

Cam ring 111 attached to the spring holder also is urged by springs 121 toward the right in FIGS. 8, 9 and 12 to its operative position for engagement with a cam follower 79. Spring members 121 are located around projecting spring positioning studs 122 threadedly engaged with the face plate 88 and the circular flange 104 of the spring holder member.

As will be described, gripper plate 116 is designed to be alternately extended and retracted relative to the generally flat inner peripheral article gripping portion of clamping flange 85, which portion is designated 125 in the drawings. It is between the inner surface of gripper plate 116 and the inner peripheral portion 125 of clamping flange 85 that a bag is grasped and held when the gripper assembly is actuated.

Referring now to FIGS. 7 and 11, it should be noted that gripper plate 116 is generally circular for approximately half its peripheral extent but is provided with a cutout portion 126 for the remainder thereof. Such cutout portion is adapted to interfit, when the gripper plate is in its retracted position, with a stripper ring section 127 held by fasteners 128 in engagement with the clamping flange 85 of the housing. The stripper ring 127 is thereby secured to rotate with the housing for the purpose to be described.

As mentioned previously, when housing 84 is in its retracted position shown in FIGS. 8, 9 and 12, the projecting boss 88' on hub 87 maintains a space, designated 131 in the drawings, between the inner clamping face of gripper plate 116 and the gripper portion 125 of clamping flange 85. Also, a space is at all times maintained between gripper plate 116 and face plate 88 by boss 88'.

Space 131 is provided to insure proper release of the last bag from the gripper assembly after such assembly has completed its final sequence of operation in a given series when the opposite gripper assembly is actuated to commence its series of operations. The extent of space 131 is governed by the length of projecting boss 88' and the extent of such space may be varied, the only requirement being that the space is greater than the thickness of the article to be gripped and rotated by the gripper assembly. In the embodiment of the apparatus illustrated, a space of approximately one-eighth inch has been found suitable for the range of bags to be handled by the apparatus.

It should be understood that, because of space 131, no bag can be clamped by the gripper assembly between the gripping portion 125 of clamping flange 85 and gripper plate 116 when the gripper assembly and its housing are in the fully retracted operatively inactive position shown in FIGS. 8, 9 and 12. To effect bag clamping by the assembly, it is first necessary with the illustrated embodiment to extend or project the housing 84 relative to the gripper plate to effect closing of space 131.

In this regard, housing 84 is slidably movable longitudinally toward gripper plate 116 with face plate 88 and circular flange 104 of the spring holder member 103 providing guiding surfaces during the longitudinal movement of which the housing is capable. That is, housing 84 may be moved to the left as seen in FIGS. 8, 9 and 12 to bring the gripping portion 125 of flange 85 into contact with the inner clamping surface of gripper plate 116. Such movement effects closing of space 131, and is the first step required in rendering the illustrated gripper assembly operative to grasp and rotate a bag fed thereto from the source of bag supply.

Referring to FIG. 9, it will be noted that, as the cam follower 79 is extended to its working position by its associated air cylinder, the cam follower will first strike a peripheral end portion 132 of housing 84. This is due to the fact that springs 98 surrounding shoulder bolts 97 normally urge the housing toward the right as seen in FIGS. 8, 9 and 12, so that a gap exists between the level section of cam ring 111 and the peripheral end portion 132 of the housing. As a result, contact of a cam follower 79 with a rotating gripper assembly first effects sliding movement of the housing to the left to close space 131. Thereafter, continued rotation of the gripper assembly produces engagement of the cam follower with the camming surface of cam ring 111 to effect a cycle of operation of the gripper assembly.

Housing 84 is slidably movable a distance sufficient to close space 131 and, in this regard, the amount the housing is actually moved is governed by the length of the stroke of the piston of the air cylinder which actuates the cam follower.

When cam follower 79 is extended by its associated air cylinder into engagement with the rotating gripper assembly, for the first 90° of rotation of the assembly (see FIG. 13), the housing is slidably projected to close space 131 between gripper plate 116 and flange 85. During this time, gripper plate 116 is held retracted by springs 121 in engagement with gripping portion 125 of the extended clamping flange 85. This situation prevails until the cam rise portion of cam ring 111 is rotated into engagement with the cam follower.

For approximately the next 180° of rotation of the gripper assembly, the cam follower urges the cam ring longitudinally to the left of the assembly as viewed in FIGS. 8, 9 and 12, so that the gripper plate is progressively moved away from clamping flange 85 to the dotted line position shown in FIG. 9. This results in a bag receiving space 131' being provided between the inner flat surface of the gripper plate 116 and the gripping portion 125 of clamping flange 85. It is into such space 131' that a bag to be grasped and reoriented is insertable by the aforementioned feed rolls 23 and 24, as shown in phantom lines in FIG. 9.

During the following approximately 70° of rotation, gripper plate 116 is abruptly retracted under the urging of springs 121 toward the clamping flange to close space 131'. However, housing 84 is still maintained in its extended position due to engagement of the cam follower with the housing so that boss 88' is ineffective to produce the aforementioned space 131 between the gripper plate 116 and flange 85. Accordingly, a bag which had been inserted into space 131' is clamped by the gripper plate as the plate is retracted against flange 85 under the urging of springs 121 when the cam ring 111 is permitted to rapidly move toward the right due to the abrupt taper of the ring camming surface from approximately the 290° location to the 360° location. That is, a bag previously inserted into space 131' is firmly grasped between the gripper plate 116 on one side and the clamping flange 85 of the extended housing on the other.

When the bag is clamped as shown schematically in FIG. 5, continued rotation of the gripper assembly effects rotation of the bag through approximately 90° so that the bag may be positioned as shown in dotted lines in FIG. 6. When the bag has been fully rotated, the cam follower 79 again passes the 90° position on cam ring 111 and urges the gripper plate away from the clamping flange of the still extended housing so that the reoriented bag may be released to the take-off conveyor worm members 41 and 42 for movement from the apparatus.

It is during this phase of the operation that stripper ring 127 comes into operation. That is, as perhaps best seen in FIG. 6, as the bag is being released by the gripper assembly, the stripper ring, which is provided wth a knife edge 132', passes between the bag and the clamping flange 85 to insure that the bag is pushed away from the housing so that, as the housing continues to rotate, the assembly is again adapted to receive a subsequent bag between the clamping flange and the gripper plate.

During each cycle of rotation of the respective gripper assemblies, so long as the cam follower 79 is engaged with the cam ring and housing of a gripper assembly, bags fed to the assembly will be grasped, rotated and freed in sequence.

It should be understood that aforementioned boss 88' performs its intended function at the end of each given sequence or series of operations of a given gripper assembly. That is, when a gripper assembly is actuated by its associated cam follower, housing 84 is maintained in its extended position so that aforementioned space 131 normally is maintained closed. However, at the end of a sequence of operation of the gripper assembly, the associated cam follower is retracted by its associated air cylinder and, accordingly, the gripper assembly housing is again urged to its retracted position by springs 98 to thereby recreate space 131 between clamping flange 85 and gripper plate 116.

The provision of such space has been found highly desirable during the high speed operation for which the gripper assemblies are designed. When a signal is transmitted by the counter mechanism 66 to a solenoid, retraction of the associated cam follower is rapidly effected and simultaneously the extension of the other cam follower is effected. In the absence of space 131 it might be possible for the last bag of a given series of bags to remain clamped between the gripper plate and the clamping flange of the inactivated gripper assembly and, consequently, to be rotated continuously with the then operatively inactive but still rotating gripper assembly.

Because space 131 is greater than the thickness of the bag or other article being collated, it is not possible for a bag to be held between the gripper plate and the clamping flange when a cam follower is out of engagement with the gripper assembly housing. As a result, separation of the last bag of a given collated series from the gripper assembly is insured.

The right hand gripper assembly 37 is identical in construction with the left hand assembly just described except that, because the assemblies are rotated in opposite directions, the stripper ring and cutout portion of the right assembly are oriented oppositely from those of the left assembly. Note FIGS. 5 and 6.

Preferably all components of the subject collating device are driven from a common power source so that such components operate in timed relationship with each other. In the embodiment illustrated, such power source includes, as seen in FIGS. 1, 2 and 4, a large drive gear 141 secured for rotation with a drive shaft 142. Drive shaft 142 is in turn rotated by the mechanism of the bag forming machine 2 in any conventional manner, and, as a result, operation of the collating device is timed to correspond with the bag feeding sequence of the bag forming machine.

Drive gear 141, as seen in FIGS. 2 and 4, has meshed therewith a smal gear 143 mounted on one end of aforementioned shaft 12 on which the bag guide rollers 11 are mounted so that shaft 12 is driven from gear 141. A gear train which drives the remaining components of the apparatus also is operatively connected with drive gear 141, as also best seen in FIGS. 2 and 4. Such gear train includes a pair of concentric gears 144 and 146 secured to a shaft 147 journaled in the side frame member 21 of the apparatus.ABear 144 is of a larger diameter than gear 146 and is meshed with drive gear 141. Gear 144 in turn is meshed with gear 149 mounted on aforementioned shaft 27 on which bag feed roll 24 is mounted to rotate with shaft 27. Gear 149 in turn is meshed with a gear 150 mounted on aforementioned shaft 26 upon which bag feed roll 23 is mounted. In this manner shaft 26 also is driven from drive gear 141.

Shaft 70, which is operatively connected to the counter mechanism 66 of the apparatus, in turn is driven from the drive gear 141 by means of an idler gear 151 mounted on a shaft 152 journaled in frame member 21 and meshed between aforementioned gear 146 and a gear 153 mounted on shaft 70. In this manner, the feed rolls and the gripper assemblies and worm members are driven directly from the same power source in timed relationship with each other so that bags fed from the forming machine may be continuously handled and collated in accordance with a prearranged schedule.

Referring now to FIGS. 1 and 3, it should be understood that the gripper assemblies are continuously rotated due to their operative connection with aforementioned shaft 70. In this regard, shaft 70 has secured thereto intermediate its ends, a pair of spaced bevel gears 161 and 162, which are respectively engaged with bevel gears 163 and 164 secured to the ends of shafts 83 which effect rotation of the gripper assemblies. The respective bevel gears in the embodiment illustrated have a 1:1 ratio so that the gripper assemblies are rotated one revolution for each revolution of shaft 70.

It should be understood, however, that other gear ratios could be employed to produce a given result. For example, if the gripper assemblies are provided with cam rings having double or duplicate camming surfaces thereon so that the assemblies need rotate only one-half revolution for each bag to be oriented, a 2:1 gear ratio could be employed between shafts 70 and 83.

The respective worm members 38 and 39 in turn are driven from shaft 70 by a chain 166 which is engaged with a pair of sprockets 167 and 168 (see FIG. 3), which are mounted on the respective shafts which drive the worm members and the gripper assemblies. In this regard, it should be understood that the worm members are rotated towards each other as are the gripper assemblies.

As seen in FIG. 2, preferably a smooth plate 171 is positioned between the gripper assemblies over which a bag being reoriented may slide during the reorienting process. Such plate 171 may be supported from the framework of the apparatus in any suitable manner.

From the foregoing it should be understood that this invention relates to a high speed device for automatically and rapidly reorienting and collating flat articles having dissimilar ends, such as paper bags, as the same are fed from a continuous source of supply, such as a bag forming machine. The speed at which the subject apparatus is operable is variable within wide limits and is determined primarily by the speed at which articles to be collated can be fed thereto. However, high speed operation in which bags are handled at a rate in the range of 400–600 bags per minute is readily effectable. It is during such high speed operation that the boss 88' is found highly desirable in insuring proper separation of the last bag of a series collated by a given gripper assembly as the counter mechanism activates the other gripper assembly.

It should also be understood that articles being collated need not necessarily be fed to the apparatus directly from a manufacturing machine, such as a bag making machine, as in the illustrated arrangement. For example, due to space requirements in a given location, intermediate conveying means, such as pressure belts or rollers, may be employed between the collating apparatus and the machine. Also, articles previously collected in a hopper supply could be subsequently fed to the subject apparatus for collation in the manner described.

While one specific embodiment and application of this invention has been disclosed, other modifications and adaptations thereto which may become evident to a person skilled in the art after having studied this disclosure are contemplated as falling within the scope of the appended claims.

I claim:

1. In combination with a bag forming machine, collating apparatus for receiving a succession of flat folded bags having top and bottom ends fed from said machine in one general direction with said bags extending lengthwise of said direction with one end thereof leading, and for selectively turning and reorienting successive bags fed thereto and thereafter collecting the same into groups; said collating apparatus comprising means for receiving bags discharged from said machine and for transferring the same in said general direction in said apparatus, means for positively grasping and turning and thereby selectively reorienting bags in sequence as the bags are transferred thereto and moved lengthwise in said general direction by said transfer means, control means for regulating said grasping and reorienting means so that the same is operable first to reorient a given number of bags with their bottom ends facing in one direction and to thereafter reorient a given number of subsequent bags with their bottom ends facing in an opposite direction, and means onto which successive bags are placed after they have been reoriented by said grasping and reorienting means for grouping thereby with previously reoriented bags.

2. The combination of claim 1 in which said means for grasping and reorienting said bags comprises a pair of spaced apart bag gripper assemblies located on opposite sides of the path along which said bags are moved lengthwise in said general direction by said transfer means, said gripper assemblies being selectively actuated in predetermined sequential relationship relative to each other by said control means for selectively orienting predetermined numbers of successive individual bags with their bottom ends facing in one of said directions in accordance with a predetermined plan.

3. The combination of claim 1 in which said means onto which successive reoriented bags are placed comprises a take-off-conveyor, said conveyor including a pair of spaced rotatable worm members each of which includes a helix between which successive reoriented bags are positioned by said grasping and reorienting means, such bags being moved by said helices against previously reoriented bags whereby said reoriented bags are grouped in series after reorientation thereof.

4. A collating device for generally flat elongated articles which have first and second dissimilar ends and side edges extending between said ends, such as folded paper bags, comprising means for receiving individual successive articles from a source of supply of such articles and for moving said successive articles in one general direction with said articles extending lengthwise of said direction with one end of each article leading, a pair of gripper assemblies to which individual articles are transferred in sequence by said means when moving in said direction while arranged lengthwise thereof, control means for actuating said gripper assemblies selectively and operatively independently of each other so that one of said assemblies may be actuated first to grasp and reorient sequentially a plurality comprising a predetermined number of said articles, and thereafter the other of said assemblies may be actuated to grasp and reorient sequentially a subsequent plurality comprising a number of said articles, whereby said articles may be reoriented in series with the first ends of the articles in one series being arranged in alignment with the second ends of the articles in an adjacent series, and means for receiving each said reoriented article on a side edge thereof and for grouping the same with similarly reoriented articles which preceded it in said device.

5. The device of claim 4 in which said means for receiving said reoriented articles from said gripper assemblies includes a pair of spaced helical worm members between which individual successively reoriented articles are placed on their side edges by said gripper assemblies, said worm members compacting said articles into groups with preceding reoriented articles.

6. The device of claim 4 which includes cam means between said control means and said gripper assemblies for actuating said assemblies to grasp and reorient said successive articles.

7. In a high speed device for reorienting articles, a gripper assembly adapted to positively grasp and reorient by turning individual articles presented thereto while said articles are conveyed in one general direction, said assembly comprising a rotatable housing having an article clamping portion at an end thereof, a gripper plate engageable with said clamping portion, means mounting said gripper plate for movement relative to said clamping portion whereby said gripper plate may be projected from said clamping portion to provide a space to receive an article to be grasped therebetween and retracted toward said clamping portion to clamp such article thereagainst, means mounting said housing for rotation about an axis extending transversely of said conveying direction, and means for continuously rotating said housing about said axis, whereby each article presented to said assembly while moving in said direction is grasped thereby and turned to lie croswise of said direction.

8. The assembly of claim 7 in which said means mounting said gripper plate for movement includes a cam ring rotatable with said housing and operatively connected with said gripper plate, said cam ring being engageable by a cam follower for selectively moving said cam ring and said gripper plate therewith longitudinally of said housing for projecting said gripper plate periodically from said clamping portion as said housing rotates, and spring means normally urging said gripper plate toward said clamping portion.

9. The assembly of claim 7 which includes a stripper member rotatable with said housing adjacent said gripper plate, said stripper member insuring separation of an article grasped by said assembly from between said gripper plate and said clamping portion after reorientation of said article has been effected.

10. A high speed gripper assembly adapted to grasp and reorient individual elongated generally flat articles, such as collapsed paper bags, while said articles are conveyed in one general direction and extend lengthwise of said direction with one end thereof leading, said assembly comprising a housing having a clamping flange thereon, a hub extending axially through said housing, means for continuously rotating said hub about an axis which extends transversely of said conveying direction, means operatively connecting said hub with said housing whereby said housing rotates when said hub is rotated, a spring holder surrounding said hub and slidable longitudinally thereof, a cam ring secured to one end of said holder, a gripper plate engageable with said clamping flange secured to the other end of said holder, said gripper plate being movable away from said clamping flange in response to movement of said holder by said cam ring, and spring means interposed between said holder and said hub normally urging said gripper plate toward said clamping flange, said cam ring being engageable with the cam follower and when thus engaged being adapted to move said ring, said holder and said gripper plate longitudinally of said housing to provide an article clamping space between said gripper plate and said clamping flange into which an article to be reoriented is insertable.

11. The assembly of claim 10 in which said gripper plate has a cutout portion extending around a portion of its periphery, and in which said housing includes a stripper ring section on said clamping flange, said stripper ring being receivable in said gripper plate cutout portion and being cooperable with said gripper plate in defining a generally continuous surface when said gripper plate is retracted into engagement with said clamping flange.

12. In combination with a bag forming machine, a high speed collating device for receiving individual bags fed from said machine to said device in one general conveying direction with each bag extending lengthwise of said conveying direction and with one end thereof leading, and for reorienting successive individual bags fed thereto by turning the same, and for thereafter collecting said individually reoriented bags in groups for subsequent handling; said collating device comprising means for receiving each bag discharged from said machine and for transferring the same in said conveying direction while each said bag extends lengthwise of said direction into said device, a pair of spaced apart gripper assemblies between which successive individual bags are transferred lengthwise in said direction and in sequence by said transfer means, means for rotating said gripper assemblies about axes which extend generally transversely of said conveying direction and for selectively actuating said gripper assemblies independently of each other whereby said assemblies may be employed selectively to grasp and rotate individual successive bags fed thereto in predetermined directions which extend laterally of said conveying direction, and take-off-conveyor means to which said successive individual bags are discharged after rotation and reorientation thereof by the respective gripper assemblies, said conveyor means including mechanism for grouping each reoriented bag discharged thereto by said gripper assemblies with the reoriented bag which preceded it in said device.

13. The combination of claim 12 in which each of said gripper assemblies includes a gripper plate and a clamping flange movable relative to each other, a cam ring operatively connected with said gripper plate, and a cam follower engageable with said cam ring for urging said cam ring toward said clamping flange and thereby urging said gripper plate away from said clamping flange, said cam follower being selectively moved into engagement with said cam ring by said means for selectively actuating said gripper assemblies, and means for normally urging said gripper plate toward said clamping flange.

14. In combination, a pair of rotatable article gripper assemblies arranged in side by side spaced relationship, means for continuously rotating said assemblies in opposite directions toward each other about fixed spaced axes, each of said assemblies including a gripper plate and a clamping surface against which said plate is normally engaged, and means for selectively and periodically urging the gripper plate of one of said assemblies at a time away from and back towards its associated clamping surface while such assembly is continuously rotating whereby an article inserted between said gripper plate and said surface may be clamped by said plate against said surface so that said article thus clamped will be rotated with such assembly to reorient the same.

15. A collating device for generally flat elongated articles which have first and second dissimilar ends, such as flat folded paper bags, comprising feed means for receiving individual articles from a source of supply of said articles and for conveying said articles in one general direction with each said article extending lengthwise of said conveying direction and with one end thereof leading, a pair of rotatable gripper assemblies between which individual articles are transferred by said feed means in sequence while said articles are moving lengthwise in said conveying direction, means for rotating said assemblies in opposite directions about fixed axes which extend generally transversely of said conveying direction, control means including cam mechanism for actuating said gripper assemblies selectively and operatively independently of each other as said assemblies rotate so that only one of said assemblies is actuated at a time to grasp and reorient an article presented between said assemblies, whereby the assembly thus actuated effects rotation and reorientation of the article grasped thereby, said control means being adapted to effect actuation of said assemblies alternately after a predetermined number consisting of a plurality of articles have been reoriented by each such assembly, and means for receiving each of said articles after reorientation thereof for grouping the same with reoriented articles which preceded it in said device.

16. In combination with means for feeding articles to be collated from a source of supply of such articles, collating apparatus for receiving individual articles from said source of supply and fed in lengthwise direction thereto, for reorienting said articles individually, and for thereafter collecting said individually reoriented articles into groups; said collating apparatus comprising means for sequentially receiving individual articles fed lengthwise thereto from said source of supply and for transferring the same lengthwise in said apparatus, means for positively grasping and reorienting individual articles in sequence as the articles pass through said apparatus while they are travelling lengthwise, control means for regulating said article grasping means so that such grasping means is operable first to grasp and turn crosswise in sequence a plurality consisting of a predetermined number of articles to reorient the same in a first position, and to thereafter grasp and turn crosswise in sequence a subsequent plurality consisting of a predetermined number of articles to reorient the same in a different position.

17. Collating apparatus for generally flat articles, such as collapsed bags or the like, which have opposite side faces, opposite ends of different thickness, and side edges extending between said ends, and for reorienting said articles in a predetermined manner upon discharge of said articles from conveying means which feeds a succession of said articles in one general direction with each said article extending lengthwise of such direction and with one end thereof leading; said apparatus comprising means adjacent the discharge end of said conveying means rotatable about an axis which extends transversely of the direction of movement of said articles on said conveying means for positively grasping successive articles and turning said articles in a lateral direction crosswise of said direction and releasing the same after they have been turned, mechanism associated with said grasping means for receiving said released articles and for bringing successively turned articles together, and control mechanism regulating said grasping means to orient first a predetermined number of said articles on said receiving mechanism with their thicker ends facing in one lateral direction and to thereafter orient a subsequent predetermined number of said articles on said receiving mechanism with their thicker ends facing in an opposite lateral direction.

18. A method of collating generally flat articles, such as collapsed bags or the like, said articles having opposite faces, opposite dissimilar ends, and side edges extending between said ends, and for reorienting said articles in a predetermined manner upon discharge of said articles from conveying means which feeds a succession of said articles in one general direction to a predetermined location with said articles extending lengthwise of said direction and with one of their ends leading: said method comprising positively grasping a predetermined number of successive articles as they are discharged in said lengthwise orientation from said conveying means, successively turning such articles while they are thus grasped in a first lateral direction about an axis which extends transversely of such conveying direction to reorient said predetermined number of successive articles crosswise of said direction with their said leading ends facing in said first lateral direction; threafter positively grasping a subsequent predetermined number of successive articles as they are discharged from said conveying means, successively turning such subsequent articles while they are thus grasped in a second lateral direction generally opposite to said first lateral direction about an axis which extends transversely of said conveying direction to reorient said subsequent predetermined number of successive articles crosswise of said conveying direction with their said leading ends facing in said second lateral direction; and after each of said successive articles has thus been reoriented to face in one of said lateral directions conveying the same away from said location on a side edge thereof and bringing the same generally into engagement with the reoriented article which preceded it to thereby group said articles in similarly oriented series.

19. The method of claim 18 in which said articles are conveyed individually to said location and are individually turned thereat to reorient their leading ends to face in one of said lateral directions prior to grouping each such article with the articles which preceded it in said apparatus.

References Cited in the file of this patent
UNITED STATES PATENTS

| | | |
|---|---|---|
| 1,348,846 | Brown et al. | Aug. 14, 1920 |
| 2,729,151 | Evers | Jan. 3, 1956 |
| 2,761,676 | Sabee | Sept. 4, 1956 |